United States Patent
Tamura et al.

(10) Patent No.: US 9,510,370 B2
(45) Date of Patent: Nov. 29, 2016

(54) RADIO BASE STATION, COMMUNICATION NODE, CONTROL METHOD FOR RADIO BASE STATION AND CONTROL METHOD FOR COMMUNICATION NODE

(71) Applicants: Tomu Tamura, Tokyo (JP); Yoshio Ueda, Tokyo (JP)

(72) Inventors: Tomu Tamura, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 116 days.

(21) Appl. No.: 13/849,260

(22) Filed: Mar. 22, 2013

(65) Prior Publication Data

US 2013/0252652 A1  Sep. 26, 2013

(30) Foreign Application Priority Data

Mar. 23, 2012 (JP) ................................. 2012-066948

(51) Int. Cl.
| | |
|---|---|
| *H04B 7/00* | (2006.01) |
| *H04W 76/02* | (2009.01) |
| *H04W 24/02* | (2009.01) |
| *H04W 84/04* | (2009.01) |

(52) U.S. Cl.
CPC ............. *H04W 76/02* (2013.01); *H04W 24/02* (2013.01); *H04W 84/045* (2013.01); *H04W 84/047* (2013.01)

(58) Field of Classification Search
CPC . H04W 84/045; H04W 76/02; H04W 92/20; H04W 68/00; H04W 8/26; H04W 88/08; H04W 8/082; H04W 76/022; H04W 28/08; H04W 36/0005; H04W 88/16; H04W 48/08; H04W 48/18; H04W 88/12; H04W 88/14; H04W 36/0011; H04W 36/22

USPC ....... 370/252, 216, 337, 254, 313, 315, 328, 370/329, 331, 411, 392, 335, 338, 389; 455/404.1, 410, 411, 422.1, 435.1, 455/436, 437, 439, 445, 450, 452.1, 453, 455/456.1, 507, 525
See application file for complete search history.

(56) References Cited

U.S. PATENT DOCUMENTS

| | | | |
|---|---|---|---|
| 2011/0122822 A1* | 5/2011 | Wu et al. ...................... 370/328 |
| 2011/0274030 A1 | 11/2011 | Wang et al. | |
| 2011/0280223 A1* | 11/2011 | Maeda et al. ................. 370/335 |
| 2012/0140697 A1* | 6/2012 | Chen et al. ................... 370/315 |

(Continued)

FOREIGN PATENT DOCUMENTS

| | | |
|---|---|---|
| EP | 2427029 A1 | 3/2012 |
| EP | 2605588 A1 | 6/2013 |

(Continued)

OTHER PUBLICATIONS

3GPP TS 22.220 V11.3.0, 3rd Generation Partnership Project; Technical Specification Group Services and System Aspects; Service requirements for Home Node B (HNB) and Home eNode B (HeNB) (release 11), Sep. 2011, pp. 1-25.

(Continued)

*Primary Examiner* — Golam Sorowar
(74) *Attorney, Agent, or Firm* — Sughrue Mion, PLLC

(57) ABSTRACT

A radio base station is provided including a controller that generates a message including identification information of the radio base station and information indicating parameters based on a detected environment. The radio base station also includes a transmitter that transmits the generated message to a communication node.

13 Claims, 13 Drawing Sheets

(56) References Cited

U.S. PATENT DOCUMENTS

| | | | | |
|---|---|---|---|---|
| 2013/0128873 A1* | 5/2013 | Eipe et al. | ............ | H04W 76/02 370/338 |
| 2013/0308527 A1* | 11/2013 | Chin et al. | ............ | H04W 76/06 370/328 |

FOREIGN PATENT DOCUMENTS

| | | |
|---|---|---|
| EP | 2725870 A1 | 4/2014 |
| WO | 2009129413 A2 | 10/2009 |
| WO | 2010/040412 A1 | 4/2010 |
| WO | 2010038839 A1 | 4/2010 |
| WO | 2012/019467 A1 | 2/2012 |

OTHER PUBLICATIONS

3GPP TS 36.413 V10.3.0, 3rd Generation Partnership Project; Technical Specification Group Radio Access Network; Evolved Universal Terrestrial Radio Access Network (E-UTRAN); S1 Application Protocol (S1AP) (release 10), Sep. 2011, pp. 1-254.

International Search Report (PCT/ISA/210 & PCT/ISA/220) issued May 14, 2013 in corresponding International Application No. PCT/JP2013/001932.

Written Opinion (PCT/ISA/237) issued May 14, 2013, in corresponding International Application No. PCT/JP32013/001932.

3GPP TS 36.413 V10.5.0, 3GPP Release 10; dated Mar. 9, 2012; 256 pages total.

3GPP TS 22.220 V11.4.0, 3GPP; Release 11; dated Dec. 21, 2011; 25 pages total.

Nokia Siemens Networks, Femto to femto enhanced mobility for 3G—architectural aspects, Discussions & Approval, 3GPP TSG-RAN WG3 Meeting #73, Aug. 22, 2011, R3-111964.

Communication dated May 12, 2015, issued by the Japan Patent Office in corresponding Japanese Application No. 2014-528743.

Communication dated Nov. 23, 2015 from the European Patent Office in counterpart application No. 13765156.8.

* cited by examiner 9.1.8.4  S1 SETUP REQUEST
This message is sent by the eNB to transfer information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(1..150...) | | YES | ignore |
| Supported TAs | | 1..<maxno ofTACs> | | Supported TAs in the eNB | GLOBAL | reject |
| >TAC | M | | 9.2.3.7 | Broadcasted TAC | - | |
| >Broadcast PLMNs | | 1..<maxno ofBPLMNs> | | Broadcasted PLMNs | - | |
| >>PLMN Identity | M | | 9.2.3.8 | | | |
| Default paging DRX | M | | 9.2.1.16 | | YES | ignore |
| CSG Id List | | 0..1 | | | GLOBAL | reject |
| >CSG Id | M | 1 to <maxnoof CSGIds> | 9.2.1.62 | | | |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |

| Range bound | Explanation |
|---|---|
| maxnoofBPLMNs | Maximum no. of Broadcasted PLMNs. Value is 6. |

| Range bound | Explanation |
|---|---|
| maxnoofCSGIds | Maximum no. of CSG Ids within the CSG Id List. Value is 256 |

Fig. 3

9.2.aa  eNB Identity
eNB Identity IE is sent from the eNB to the MME and identifies the eNB.

| IE/Group Name | Presence | Range | IE type and reference | Semantics description |
|---|---|---|---|---|
| eNB Identity | | | OCTET STRING (SIZE(1..265)) | See note below |

Note:
The octet string shall take form of an Network Access Identifier (NAI) as defined in IETF RFC 4282[18].
The format of the eNB-Identity will be:
0<IMSI>@<realm>
Or
1<OUI>-<SerialNumber>@<realm>
Where <IMSI> is a 15 digit number coded as specified in TS23.003[xx];
and <OUI> and <SerialNumber> are coded as specified in TR-069[xx].

Fig. 4

9.2.bb    eNB Environment Information
The eNB Environment Information IE is sent from the eNB to MME to provide eNB Environment Information.

| IE/Group Name | Presence | Range | IE type and reference | Semantics description | Criticality | Assigned Criticality |
|---|---|---|---|---|---|---|
| eNB Environment Information | | 1 | | | - | - |
| >Radio Information | O | | 9.2.cc | | - | - |
| >Non Radio Information | O | | 9.2.dd | | - | - |

Fig. 5

9.2.cc    Radio Information
The Radio Information IE is composed of the received information from the surrounding base stations, WiMAX base stations, wireless internet hotspots, television stations, radio stations and GPS.

| IE/Group Name | Presence | Range | IE type and reference | Semantics description |
|---|---|---|---|---|
| E-UTRAN Cell ID Information | O | 1..<maxnoof RadioInfo> | | |
| >TAC | M | | 9.2.3.7 | |
| >PLMN-ID | M | | 9.2.3.8 | |
| >Cell Identity | M | | BIT STRING (28) | The leftmost bits of the Cell Identity correspond to the eNB ID (defined in sub clause 9.2.1.37) |
| >Received Signal Strength | M | | 9.2.xx | |
| UTRAN Cell ID Information | O | 1..<maxnoofR adioInfo> | | |
| >LAC | M | | 9.2.xx | |
| >RAC | M | | 9.2.xx | |
| >URA identity list | M | 1..<MaxURA> | 9.2.xx | |
| >>URA identity | M | | URA identity 9.2.xx | |
| >PLMN-ID | M | | 9.2.xx | |
| >CellID | M | | 9.2.xx | |
| >Received Signal Strength | M | | 9.2.xx | |
| GERAN Cell ID Information | O | 1..<maxnoofR adioInfo> | | |
| >PLMN-ID | M | | 9.2.xx | |
| >LAC | M | | 9.2.xx | 0000 and FFFE not allowed |
| >CI | M | | OCTET STRING (2) | |
| >Received Signal Strength | M | | 9.2.xx | |
| WiMAX base stations Information | O | 1..<maxnoofR adioInfo> | | |
| >BSID | M | | 9.2.xx | |
| >Paging Group ID | M | | 9.2.xx | |
| >Received Signal Strength | M | | 9.2.xx | |
| Wireless Internet hotspots Information | | 1..<maxnoofR adioInfo> | | |
| >BSSID | M | | 9.2.xx | |
| >ESSID | M | | 9.2.xx | |
| >Received Signal Strength | M | | 9.2.xx | |

Fig. 6A

| | | | | |
|---|---|---|---|---|
| Television stations Information | O | 1..<maxnoo fRadioInfo> | 9.2.xx | |
| >TV Frequency | M | | 9.2.xx | |
| >Received Signal Strength | M | | 9.2.xx | |
| Radio stations Information | O | 1..<maxnoo fRadioInfo> | 9.2.xx | |
| >Radio Frequency | M | | 9.2.xx | |
| >Received Signal Strength | M | | 9.2.xx | |
| GPS Information | O | 1..<maxnoo fRadioInfo> | | |
| >Geographical Coordinates | M | | | |
| >>Latitude Sign | M | | ENUMERATED (North, South) | |
| >>Degrees Of Latitude | M | | INTEGER (0..$2^{23}$-1) | The IE value (N) is derived by this formula: $N \leq 2^{23} \times X / 90 < N+1$ X being the latitude in degree (0°..90°) |
| >>Degrees Of Longitude | M | | INTEGER ($-2^{23}$..$2^{23}$-1) | The IE value (N) is derived by this formula: $N \leq 2^{23} \times X / 360 < N+1$ X being the longitude in degree (-180°..+180°) |
| >Altitude and Direction | M | | | |
| >>Direction of Altitude | M | | ENUMERATED (Height, Depth) | |
| >>Altitude | M | | INTEGER (0..$2^{15}$-1) | The relation between the value (N) and the altitude (a) in meters it describes is N≤ a <N+1, except for N=$2^{15}$-1 for which the range is extended to include all greater values of (a). |

| Range bound | Explanation |
|---|---|
| maxnocfRadioInfo | Maximum no. of reported information. Value is xx |

Fig. 6B

9.2.dd Non Radio Information

This IE indicates non radio information such as IP address, phone number of the fixed line, address, postcode, and, if any, the identifier of the previously connected HeNB-GW.

| IE/Group Name | Presence | Range | IE type and reference | Semantics description |
|---|---|---|---|---|
| CHOICE *IP Address* | O | | | |
| >*IPV4* | | | | |
| >>Internet Address ipv4 | M | | OCTET STRING(4) | |
| >*IP6* | | | | |
| >>Internet Address ipv6 | M | | OCTET STRING(16) | |
| Phone number | O | | 9.2.xx | |
| Address | O | | 9.2.xx | |
| Postcode | O | | 9.2.xx | |
| HeNB-GW Id | O | | 9.2.xx | |

Fig. 7

9.1.8.7 ENB CONFIGURATION UPDATE
This message is sent by the eNB to transfer updated information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB Name | O | | PrintableString(1..150...) | | YES | ignore |
| Supported TAs | | 0..<maxno ofTACs> | | Supported TAs in the eNB | GLOBAL | reject |
| >TAC | M | | 9.2.3.7 | Broadcasted TAC | - | |
| >Broadcast PLMNs | | 1..<maxno ofBPLMNs> | | Broadcasted PLMNs | - | |
| >>PLMN Identity | M | | 9.2.3.8 | | - | |
| CSG Id List | | 0..1 | | | GLOBAL | reject |
| >CSG Id | M | 1 to <maxnoof CSGIds> | 9.2.1.62 | | - | |
| Default paging DRX | O | | 9.2.1.16 | | YES | ignore |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |

Fig. 9

9.1.8.6  S1 SETUP FAILURE
This message is sent by the MME to indicate S1 Setup failure.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cause | M | | 9.2.1.3 | | YES | ignore |
| Time to wait | O | | 9.2.1.61 | | YES | ignore |
| Criticality Diagnostics | O | | 9.2.1.21 | | YES | ignore |
| Prohibited eNB Environment Information | O | | 9.2.ee | | YES | ignore |

Fig. 12

9.2.ee  Prohibited eNB Environment Information
The *Prohibited eNB Environment Information* IE is sent from the eNB to MME to provide Prohibited eNB Environment Information.

| IE/Group Name | Presence | Range | IE type and reference | Semantics description | Criticality | Assigned Criticality |
|---|---|---|---|---|---|---|
| Prohibited eNB Environment Information | | 1 | | | - | - |
| >Radio Information | O | | 9.2.cc | | - | - |
| >Non Radio Information | O | | 9.2.dd | | - | - |

Fig. 13

9.1.8.1 RESET

This message is sent by both MME and the eNB and is used to request that the S1 interface, or parts of the S1 interface, to be reset.

Direction: MME → eNB and eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cause | M | | 9.2.1.3 | | YES | ignore |
| CHOICE Reset Type | M | | | | YES | reject |
| >S1 interface | | | | | | |
| >>ResetAll | M | | ENUMERATED (Reset all,...) | | - | |
| >Part of S1 interface | | | | | | |
| >>UE-associated logical S1-connection list | | 1 | | | - | |
| >>>UE-associated logical S1-connection Item | | 1 to <maxnoofIndividualS1C onnectionsT oReset> | | | EACH | reject |
| >>>>MME UE S1AP ID | O | | 9.2.1.3 | | - | |
| >>>>eNB UE S1AP ID | O | | 9.2.1.4 | | - | |
| Prohibited eNB Environment Information | O | | 9.2.ee | | YES | ignore |

| Range bound | Explanation |
|---|---|
| maxnoofIndividualS1Connections ToReset | Maximum no. of UE-associated logical S1-connections allowed to reset in one message. Value is 256. |

Fig. 17

RADIO BASE STATION, COMMUNICATION NODE, CONTROL METHOD FOR RADIO BASE STATION AND CONTROL METHOD FOR COMMUNICATION NODE

CROSS-REFERENCE TO RELATED APPLICATION

This application is based upon and claims the benefit of priority from Japanese patent application No. 2012-066948, filed on Mar. 23, 2012, the disclosure of which is incorporated herein in its entirety by reference.

BACKGROUND

The exemplary embodiments relate to a radio communication system, a radio base station, an upper node, and a communication method.

In the recent radio communication system, there is a case of newly introducing a small-type radio base station called as "femto base station" in addition to the existing radio base station, and thereby of providing a service in a femto cell. In the 3G (Third Generation) system, the radio base station is referred to as "NB (Node B)", and the femto base station is referred to as "HNB (Home Node B)". Further, in the LTE (Long Term Evolution) system, the radio base station is referred to as "eNB (evolved Node B)", and the femto base station is referred to as "HeNB (Home evolved Node B)". Furthermore, if both of the HNB and the HeNB are intended, they are referred to as "H(e)NB". The H(e)NB can be installed in a house, a store or the like. Therefore, there is flexibility for a location at which the H(e)NB is installed.

Non-Patent Literature 1 (Service requirements for Home Node B (HNB) Home eNode B (HeNB) [3GPP TS 22.220 v11.3.0]) defines service requirements for the H(e)NB in 3GPP (Third Generation Partnership Project). According to Non-Patent Literature 1, upon installing the H(e)NB, it is required for the telecommunications carrier to verify an identification information (identity) of the H(e)NB, and to acquire information on a geographical location of the H(e)NB. Further, it is required for the telecommunications carrier to determine the installation and operation of the H(e)NB in accordance with all the related regulatory requirements.

Further, Non-Patent Literature 2 (Evolved Universal Terrestrial Radio Access Network (E-UTRAN); S1 Application Protocol (S1AP) [3GPP TS 36.413 v10.3.0]) defines, as S1AP (S1 Application Protocol), the specification of interfaces between the HeNB, and an HeNB-GW (Home evolved Node B Gateway) and an MME (Mobility Management Entity) which are upper nodes for the HeNB.

The aforementioned background art has problems as follows.

Non-Patent Literature 2 has not defined any specific method for notifying the identification information of the HeNB, the information on the geographical location of the HeNB, and the like. Therefore, the upper node cannot acquire the identification information of the HeNB, the information on the geographical location of the HeNB, and the like.

Further, it is desired for the H(e)NB to notify the upper node of information on environments around the H(e)NB, so that the telecommunications carrier can determine the installation and operation of the H(e)NB in accordance with all the related regulatory requirements.

Further, there is a similar problem for an RN (Relay Node) including a function of relaying the radio base station. That is, there is a case where the backhaul line for the RN is a wireless network. Therefore, the RN may move to another location. Accordingly, it is desired for the telecommunications carrier to appropriately determine whether or not it is possible to install and operate the RN as with the case of the H(e)NB.

SUMMARY

The above-mentioned problems are caused by the fact that the radio base station does not notify the upper node of the identification information and the information on environments around the radio base station. Accordingly, an exemplary object of the exemplary embodiments is to provide a radio communication system in which a radio base station can notify an upper node of identification information and information on environments around the radio base station, and thereby to solve any one of the above-mentioned problems. However, the exemplary embodiments may achieve objectives other than those described above. Further, exemplary embodiments are not required to achieve the objectives described above, and an exemplary embodiment may not achieve any of the objectives described above.

A radio communication system according to the exemplary embodiment includes a radio base station that wirelessly communicates with a radio terminal; and an upper node that communicates with the radio base station. In this radio communication system, the radio base station includes a transmitter that transmits, to the upper node, a message including identification information of the radio base station and information on environments around the radio base station. The upper node includes a receiver that receives the message.

A radio base station according to an exemplary embodiment wirelessly communicates with a radio terminal. This radio base station includes a transmitter that transmits, to an upper node, a message including identification information of the radio base station and information on environments around the radio base station.

An upper node according to an exemplary embodiment communicates with a radio base station. This upper node includes a receiver that receives a message including identification information of the radio base station and information on environments around the radio base station. The message is transmitted by the radio base station.

A communication method according to an exemplary embodiment is a method for communication in a radio communication system including a radio base station that wirelessly communicates with a radio terminal, and an upper node that communicates with the radio base station. This method includes the steps of: transmitting, by the radio base station, a message to the upper node, the message including identification information of the radio base station and information on environments around the radio base station; and receiving the message by the upper node.

According to the exemplary embodiment, a radio base station can notify an upper node of identification information and information on environments around the radio base station. Therefore, the upper node can determine whether or not it is possible to install and operate the radio base station.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 3 shows an example of information transmitted from an HeNB to an HeNB-GW in the first exemplary embodiment;

FIG. 4 shows an example of information transmitted from the HeNB to the HeNB-GW in the first exemplary embodiment;

FIG. 5 shows an example of information transmitted from the HeNB to the HeNB-GW in the first exemplary embodiment;

FIG. 6A shows an example of information transmitted from the HeNB to the HeNB-GW in the first exemplary embodiment;

FIG. 6B shows an example of information transmitted from the HeNB to the HeNB-GW in the first exemplary embodiment;

FIG. 7 shows an example of information transmitted from the HeNB to the HeNB-GW in the first exemplary embodiment;

FIG. 9 shows an example of information transmitted from an HeNB to an HeNB-GW in the second exemplary embodiment;

FIG. 12 shows an example of information transmitted from a DeNB to an RN in the third exemplary embodiment;

FIG. 13 shows an example of information transmitted from the DeNB to the RN in the third exemplary embodiment;

FIG. 17 shows an example of information transmitted from a DeNB to an RN in the fifth exemplary embodiment.

EXEMPLARY EMBODIMENTS

Hereinafter, exemplary embodiments will be described with reference to the drawings. The word "exemplary" is used herein to mean "serving as an example, instance, or illustration". Any embodiment described herein as "exemplary" is not necessarily to be construed as preferred or advantageous over other embodiments.

First Exemplary Embodiment

A first exemplary embodiment is applied to a sequence for establishing an S1 connection between an HeNB and an HeNB-GW.

Figure 1:
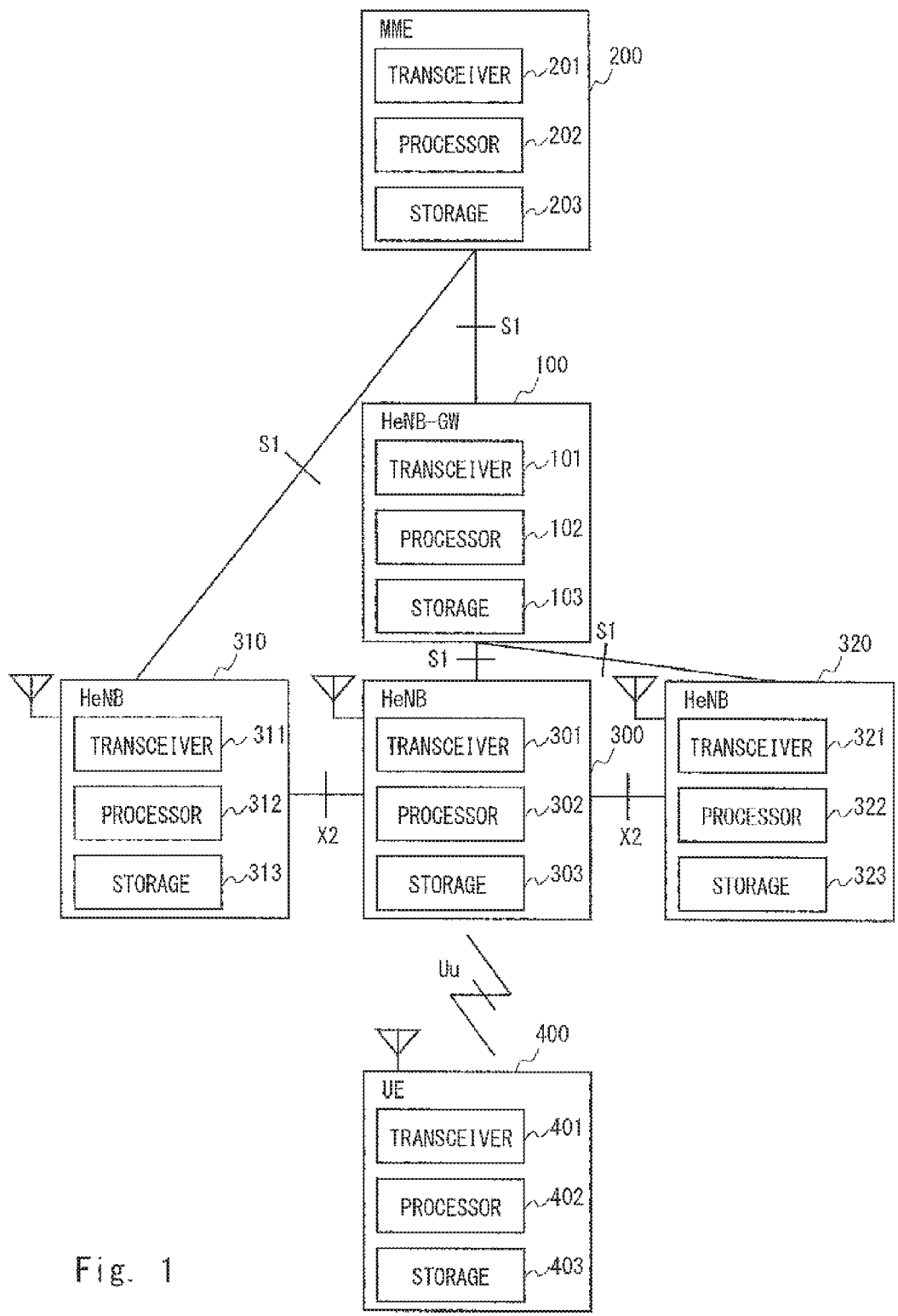
FIG. 1 is a diagram showing a configuration according to a first exemplary embodiment.

FIG. 1 is a diagram showing an example of a configuration according to the first exemplary embodiment. A radio communication system according to this exemplary embodiment includes an HeNB-GW 100, an MME 200, an HeNB 300, and a UE (User Equipment) 400. The UE 400 is also called "radio terminal" or "user terminal". The MME 200 is a device in a core network, and includes a function of managing mobility of the UE 400. The HeNB-GW 100 is a gateway device which connects the HeNB 300 to the core network.

The HeNB-GW 100 includes a transceiver 101, a processor 102, and storage 103. The HeNB-GW 100 can communicate with the HeNB 300 and an HeNB 320, and transmits and receives messages using the S1AP. Similarly, the HeNB-GW 100 also transmits and receives messages using the S1AP to and from the MME 200. In the HeNB-GW 100, the transceiver 101 performs processing for transmitting and receiving information, the processor 102 performs processing for generating and analyzing the transmitted and received information, and the storage 103 performs processing for storing the transmitted and received information.

The MME 200 includes a transceiver 201, a processor 202, and storage 203. The MME 200 can communicate with an HeNB 310 in addition to the above-mentioned HeNB-GW 100, and transmits and receives messages using the S1AP. In the MME 200, the transceiver 201 performs processing for transmitting and receiving information, the processor 202 performs processing for generating and analyzing the transmitted and received information, and the storage 203 performs processing for storing the transmitted and received information.

The HeNB 300 includes a transceiver 301, a processor 302, and storage 303. The HeNBs 310 and 320 are similarly configured. There are a case where the HeNB communicates, like the HeNB 310, with the MME 200 as the upper node, and a case where the HeNB communicates, like the HeNBs 300 and 320, with the HeNB-GW 100 as the upper node. The HeNB transmits and receives messages using the S1AP to and from these upper nodes. Further, the HeNB 300 can wirelessly communicate with the UE 400, and the interface therebetween is defined as "Uu". Further, the HeNBs 300, 310 and 320 can communicate with each other, and the interface therebetween is defined as "X2". In the HeNB 300, the transceiver 301 performs processing for transmitting and receiving information, the processor 302 performs processing for generating and analyzing the transmitted and received information, and the storage 303 performs processing for storing the transmitted and received information. The similar explanation is also applied to the HeNBs 310 and 320.

The UE 400 includes a transceiver 401, a processor 402, and storage 403. As described above, the UE 400 wirelessly communicates with the HeNB 300. In the UE 400, the transceiver 401 performs processing for transmitting and receiving information, the processor 402 performs processing for generating and analyzing the transmitted and received information, and the storage 403 performs processing for storing the transmitted and received information.

Figure 2:
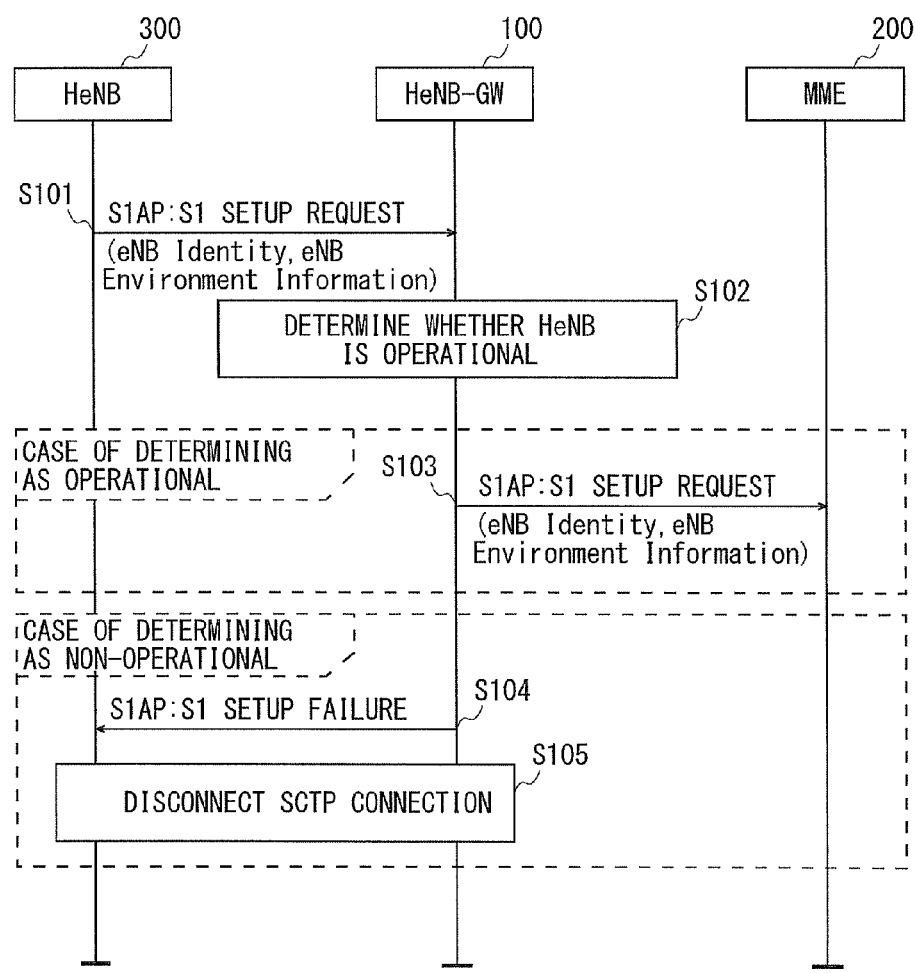
FIG. 2 is a sequence diagram showing an operation according to the first exemplary embodiment.

FIG. 2 is a sequence diagram showing an example of an operation according to the first exemplary embodiment of the present invention. Hereinafter, with reference to FIG. 2, there will be described operations of the HeNB 300, the HeNB-GW 100 and the MME 200.

At S101, the HeNB 300 transmits an S1 SETUP REQUEST message to the HeNB-GW 100. The S1 SETUP REQUEST is a message transmitted from the HeNB to the HeNB-GW for establishing the S1 connection only after a connection at TNL (Transport Network Layer) has become available, the detail of which is disclosed in Non-Patent Literature 2. Hereinafter, the detail of IEs (Information Elements) included in this message will be described with reference to FIGS. 3 to 7.

FIG. 3 is a diagram showing an example of the IEs in the S1 SETUP REQUEST. In this figure, eNB Identity is identification information of a radio base station, and eNB Environment Information is information on environments around the radio base station. Note that the eNB Identity and the eNB Environment Information are not disclosed in Non-Patent Literature 2.

FIG. 4 is a diagram showing an example of the detail of IEs included in the eNB Identity. The eNB Identity is an information element for identifying the radio base station.

FIG. 5 is a diagram showing an example of the detail of IEs included in the eNB Environment Information. The eNB Environment Information is composed of Radio Information which is information on a radio environment, and Non Radio Information which is information on environments other than the radio environment.

FIG. 6 is a diagram showing an example of the detail of IEs included in the Radio Information. IEs of E-UTRAN Cell ID Information include various information items on cells in E-UTRAN (Enhanced Universal Terrestrial Radio Access Network). IEs of UTRAN Cell ID Information include various information items on cells in UTRAN (Universal Terrestrial Radio Access Network). IEs of GERAN Cell ID Information include various information items on cells in GERAN (GSM (registered trademark) EDGE Radio Access Network). IEs of WiMAX base stations Information includes various information items on base stations by WiMAX (Worldwide Interoperability for Microwave Access). IEs of Wireless Internet hotspots Information include various information items on wireless Internet hotspots. IEs of Television stations Information include various information items on television stations. IEs of Radio Stations Information include various information items on radio stations. IEs of GPS Information include various information items on GPS (Global Positioning System). Note that as shown in FIG. 6, this information on GPS includes location information such as latitude, longitude and altitude. However, this information is not always limited to information which is acquired by using GPS mounted on the radio base station.

FIG. 7 is a diagram showing an example of the detail of IEs included in the Non Radio Information. CHOICE IP Address is an IE indicating an IP (Internet Protocol) address assigned to the radio base station. Phone number, Address and Postcode are IEs indicating a phone number, an address and a post code, respectively, regarding a location at which the radio base station is installed. HeNB-GW ID is an IE indicating identification information of an HeNB-GW which is most recently connected to an HeNB in the case where the radio base station is the HeNB.

At S102 in FIG. 2, the HeNB-GW 100 determines whether or not the HeNB 300 is operational based on the eNB Identity and the eNB Environment Information included in the received S1 SETUP REQUEST. The detail of operations for the determination is explained with a specific example. For example, based on policies for operating the HeNB 300, the HeNB-GW 100 specifically stores, in the storage 103, information on surrounding environments determined as non-operational, e.g., location information such as an address, a post code, latitude and longitude regarding a location at which the HeNB 300 is installed, an IP address, and various information items on a WiMAX-compatible base station. The HeNB-GW 100 compares the information stored in the storage 103 with the IEs included in the eNB Environment Information acquired from the S1 SETUP REQUEST. The HeNB-GW 100 determines as non-operational if they coincide with each other as a result of the comparison, otherwise determines as operational.

Note that the information element used as conditions for this determination may be a certain specific information element, or may be combined plural information elements. A value of the information element stored in the storage 103 and determined as non-operational may be a predetermined value or a value indicated within a predetermined range. Further, while the information on the conditions for determining as non-operational is stored in the storage 103 in the above-mentioned example, information on conditions for determining as operational may be stored in the storage 103. Furthermore, upon determining whether or not the HeNB is operational, the HeNB-GW 100 may inquire of a different device which stores and manages policies regarding conditions for the determination, a management device in a different radio communication system or the like, about the conditions for the determination, and may perform the determination after acquiring necessary information. This allows the maintenance such as revising and changing the conditions for the determination to be easily implemented.

At S103, the HeNB-GW 100 transmits an S1 SETUP REQUEST message to the MME 200 if the HeNB-GW 100 has determined as operational at S102. After that, normal processing is carried on, so that the HeNB 300 can start its operation.

At S104, the HeNB-GW 100 transmits an S1 SETUP FAILURE message to the HeNB 300 if the HeNB-GW 100 has determined as non-operational at S102. The detail of S1 SETUP FAILURE is disclosed in Non-Patent Literature 2.

At S105, the HeNB-GW 100 disconnects SCTP (Stream Control Transmission Protocol) connection between the HeNB-GW 100 and the HeNB 300. As a result, the HeNB 300 cannot operate. Note that either one of S104 and S105 can be omitted. In the case of omitting S104, transmission and reception of messages between the HeNB 300 and the HeNB-GW 100 are reduced. Therefore, it is possible to improve the usability of communication lines. In addition, it is possible to reduce processing loads on the HeNB 300 and the HeNB-GW 100. On the other hand, in the case of omitting S105, it is possible to reduce the processing loads on the HeNB 300 and the HeNB-GW 100.

As described above, the HeNB-GW 100 according to the first exemplary embodiment receives from the HeNB 300 the message including the identification information of the HeNB 300 and the information on the environments around the HeNB 300, in the sequence for establishing the S1 connection. As a result, the HeNB-GW 100 can determine whether or not the HeNB 300 is operational. Further, in the present invention, the IEs are added to the existing message using the S1AP. Therefore, it is possible to solve the problems without newly adding any messages.

Second Exemplary Embodiment

A second exemplary embodiment is applied to a situation where the S1 connection has been already established between the HeNB and the HeNB-GW.

A configuration according to the second exemplary embodiment is the same as that according to the first exemplary embodiment. Therefore, its explanation is omitted.

Figure 8:
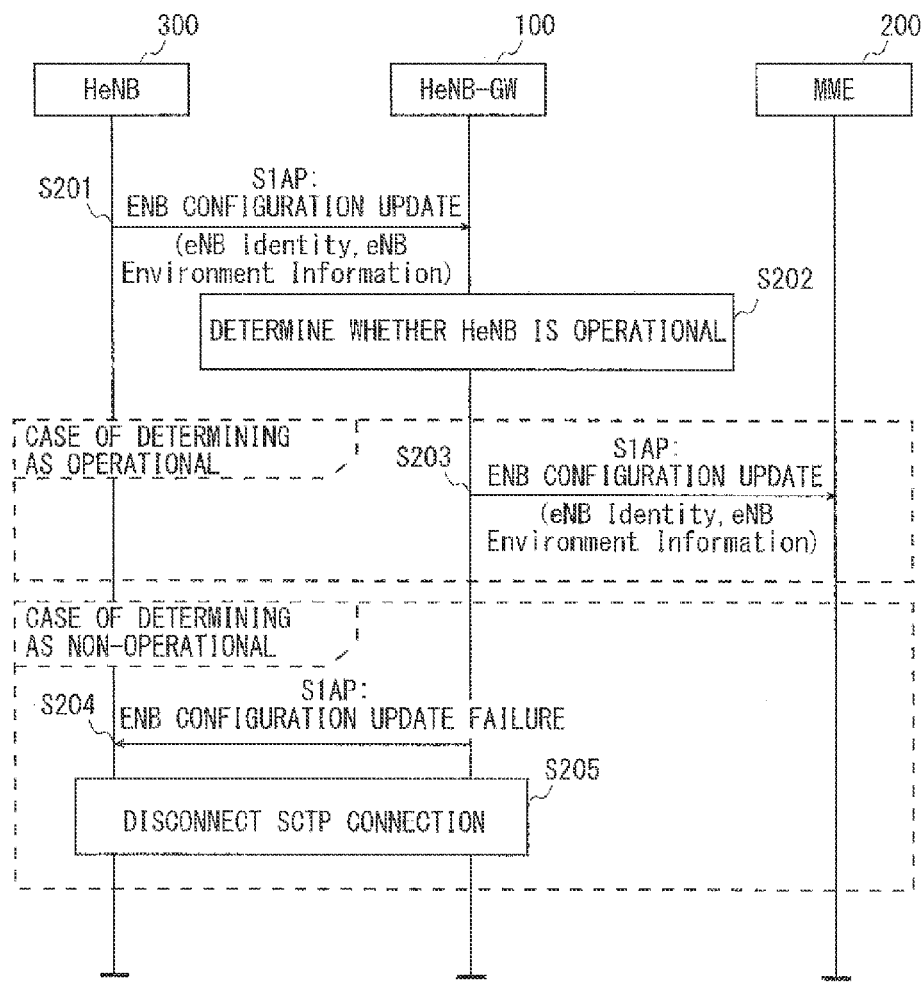
FIG. 8 is a sequence diagram showing an operation according to a second exemplary embodiment.

FIG. 8 is a sequence diagram showing an example of an operation according to the second exemplary embodiment. Hereinafter, with reference to FIG. 8, there will be described operations of the HeNB 300, the HeNB-GW 100 and the MME 200.

At S201, the HeNB 300 transmits an ENB CONFIGURATION UPDATE message to the HeNB-GW 100. The detail of ENB CONFIGURATION UPDATE is disclosed in Non-Patent Literature 2.

FIG. 9 is a diagram showing an example of IEs in the ENB CONFIGURATION UPDATE. In this figure, eNB Identity is the same as that in the first exemplary embodiment, as shown in FIG. 4. Further, eNB Environment Information is the same as that in the first exemplary embodiment, as shown in FIG. 5. Note that the eNB Identity and the eNB Environment Information are not disclosed in Non-Patent Literature 2.

At S202 in FIG. 8, the HeNB-GW 100 determines whether or not the HeNB 300 is operational based on the eNB Identity and the eNB Environment Information included in the received ENB CONFIGURATION UPDATE. A specific example of operations for the determination is the same as that at S102 in the first exemplary embodiment. Therefore, its explanation is omitted.

At S203, the HeNB-GW 100 transmits ENB CONFIGURATION UPDATE to the MME 200 if the HeNB-GW 100 has determined as operational at S202. After that, normal processing is carried on, so that the HeNB 300 can start its operation.

At S204, the HeNB-GW 100 transmits an ENB CONFIGURATION UPDATE FAILURE message to the HeNB 300 if the HeNB-GW 100 has determined as non-operational at S202. The detail of ENB CONFIGURATION UPDATE FAILURE is disclosed in Non-Patent Literature 2.

At S205, the HeNB-GW 100 disconnects SCTP connection between the HeNB-GW 100 and the HeNB 300. As a result, the HeNB 300 cannot operate. Note that S204 may be omitted. In this case, transmission and reception of messages between the HeNB 300 and the HeNB-GW 100 are reduced. Therefore, it is possible to improve the usability of communication lines. In addition, it is possible to reduce processing loads on the HeNB 300 and the HeNB-GW 100.

As described above, the HeNB-GW 100 according to the second exemplary embodiment receives from the HeNB 300 the message including the identification information of the HeNB 300 and the information on the environments around the HeNB 300, in the case where the S1 connection has been already established. As a result, the HeNB-GW 100 can determine whether or not the HeNB 300 is operational based on this message. Further, the IEs are added to the existing message using the S1AP. Therefore, it is possible to solve the problems without newly adding any messages.

Third Exemplary Embodiment

A third exemplary embodiment is not applied to the HeNB but is applied to an RN.

Figure 10:
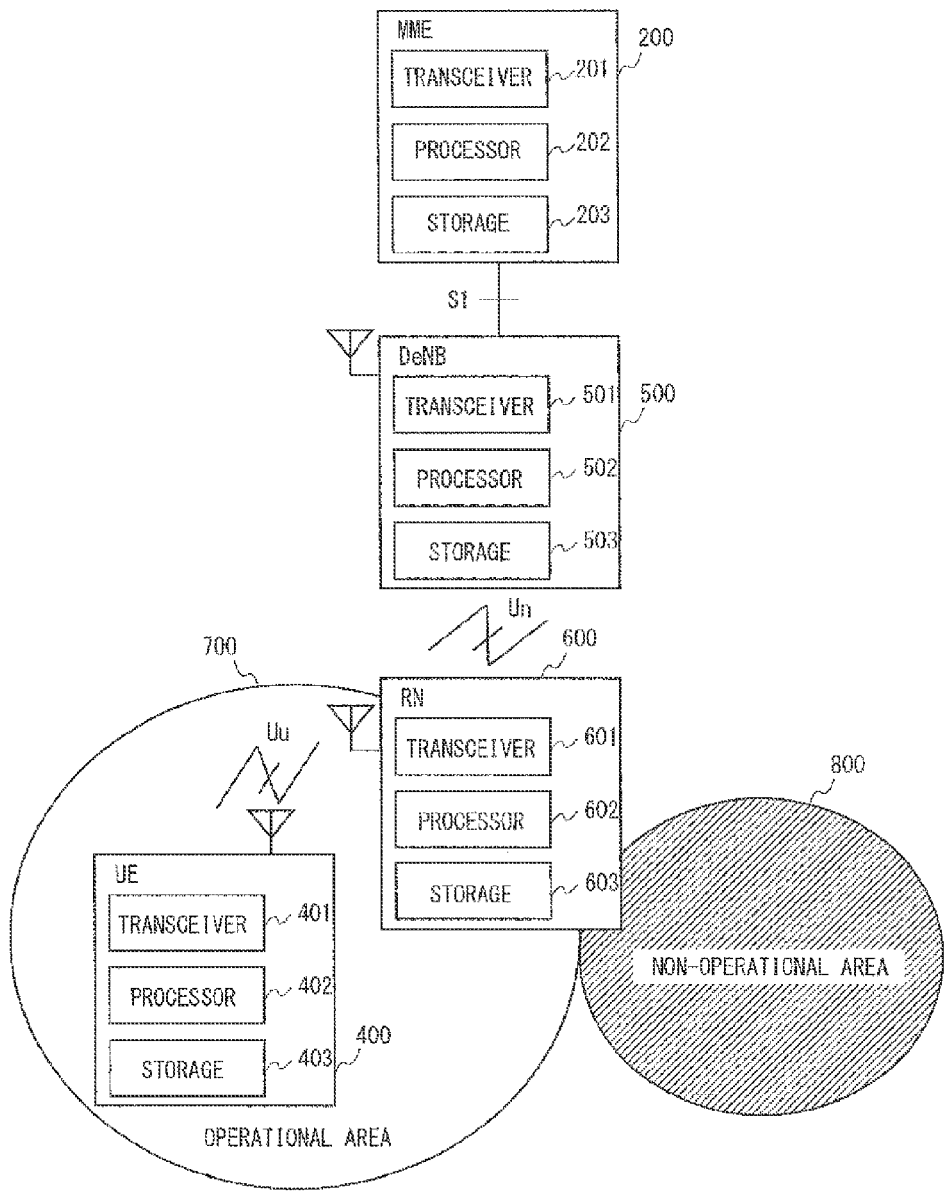
FIG. 10 is a diagram showing a configuration according to a third exemplary embodiment.

FIG. 10 is a diagram showing an example of a configuration according to the third exemplary embodiment. A radio communication system according to this exemplary embodiment includes the MME 200, a DeNB (Donor eNB) 500, an RN 600, and the UE 400. Further, in FIG. 10, there are shown an area 700 in which the RN 600 can operate and an area 800 in which the RN 600 cannot operate.

The configuration of the MME 200 is the same as that in the first exemplary embodiment. Therefore, it explanation is omitted.

The DeNB 500 includes a transceiver 501, a processor 502, and storage 503. The DeNB 500 can communicate with the MME 200, and transmits and receives message using the S1AP. Further, the DeNB 500 can wirelessly communicate with the RN 600, and the interface therebetween is defined as "Un". The message using the S1AP is transmitted and received on the Un. In the DeNB 500, the transceiver 501 performs processing for transmitting and receiving information, the processor 502 performs processing for generating and analyzing the transmitted and received information, and the storage 503 performs processing for storing the transmitted and received information.

The RN 600 includes a transceiver 601, a processor 602, and storage 603. The RN 600 can wirelessly communicate with the UE 400 in addition to the above-mentioned DeNB 500, and the interface therebetween is defined as "Uu". In the RN 600, the transceiver 601 performs processing for transmitting and receiving information, the processor 602 performs processing for generating and analyzing the transmitted and received information, and the storage 603 performs processing for storing the transmitted and received information.

The configuration of the UE 400 is the same as that in the first exemplary embodiment. Therefore, its explanation is omitted.

Figure 11:
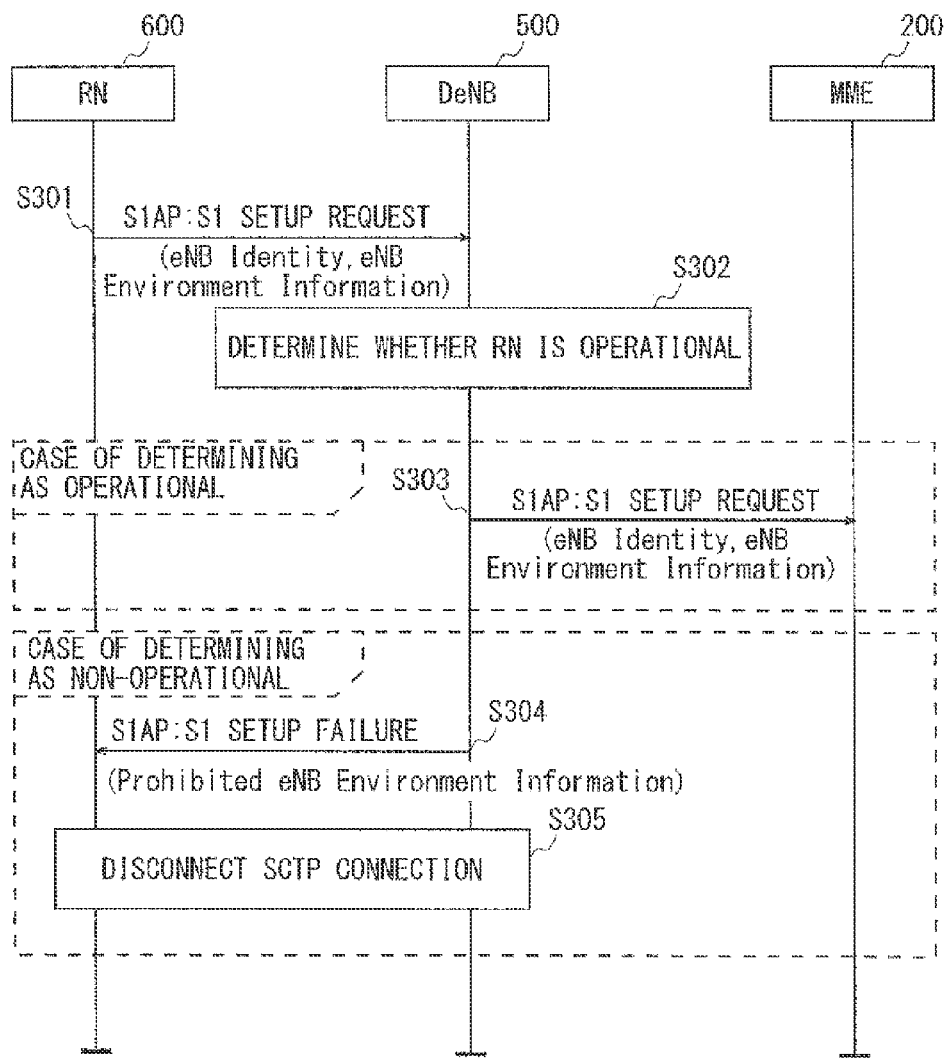
FIG. 11 is a sequence diagram showing an operation according to the third exemplary embodiment.

FIG. 11 is a sequence diagram showing an example of an operation according to the third exemplary embodiment. The operation in this exemplary embodiment is almost the same as the operation that is performed in a configuration obtained by replacing the HeNB 300 with the RN 600 and replacing the HeNB-GW 100 with the DeNB 500 in the first exemplary embodiment shown in FIG. 2.

Operations from S301 to S305 are the same as those from S101 to S105 in FIG. 2. Therefore, their explanation is omitted. A specific operation at S302 can be performed as follows. The DeNB 500 stores, in the storage 503, information on conditions indicating the operational area 700 or the non-operational area 800, e.g., location information. The DeNB 500 compares the information stored in the storage 503 with the IEs included in the eNB Identity and the eNB Environment Information acquired from the S1 SETUP REQUEST. The DeNB 500 determines as non-operational if they coincide with each other as a result of the comparison, otherwise determines as operational.

Note that at S304, the DeNB 500 may include information on surrounding environments determined as non-operational in the S1 SETUP FAILURE to be transmitted to the RN 600.

FIG. 12 is a diagram showing an example of IEs in the S1 SETUP FAILURE in such a case. IEs of Prohibited eNB Environment Information are information on the surrounding environments determined as non-operational, but are not disclosed in Non-Patent Literature 2.

FIG. 13 is a diagram showing an example of the detail of the IEs of Prohibited eNB Environment Information. Radio Information is the one as shown in FIG. 6, and Non Radio Information is the one as shown in FIG. 7.

As described above, the DeNB 500 according to the third exemplary embodiment receives from the RN 600 the message including the identification information of the RN 600 and the information on the environments around the RN 600, in the sequence for establishing the S1 connection. As a result, the DeNB 500 can determine whether or not the RN 600 is operational based on this message. Further, the DeNB 500 notifies the RN 600 of the information on the surrounding environments determined as non-operational when the DeNB 500 determines that the RN 600 is not operational. As a result, it is possible to prompt the RN 600 to operate under appropriate environments. Furthermore, the IEs are added to the existing message using the S1AP. Therefore, it is possible to solve the problems without newly adding any messages.

Fourth Exemplary Embodiment

A fourth exemplary embodiment is not applied to the HeNB but is applied to the RN in the second exemplary embodiment.

A configuration according to the fourth exemplary embodiment is the same as that according to the third exemplary embodiment. Therefore, its explanation is omitted.

Figure 14:
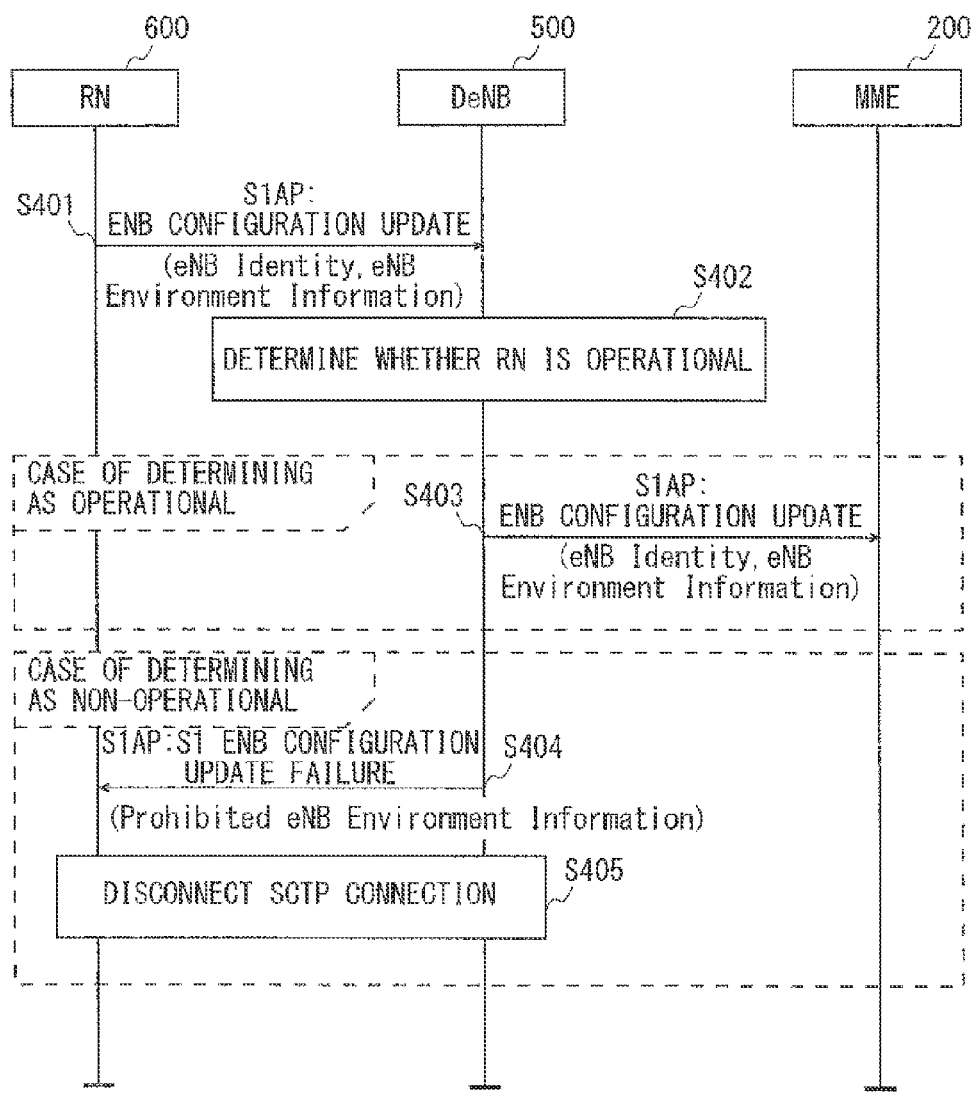
FIG. 14 is a sequence diagram showing an operation according to a fourth exemplary embodiment.

FIG. 14 is a sequence diagram showing an example of an operation according to the fourth exemplary embodiment. The operation in this exemplary embodiment is almost the same as the operation that is performed in a configuration obtained by replacing the HeNB 300 with the RN 600 and replacing the HeNB-GW 100 with the DeNB 500 in the second exemplary embodiment shown in FIG. 8.

Operations from S401 to S405 are the same as those from S201 to S205 in FIG. 8. Therefore, their explanation is omitted. A specific operation at S402 can be performed as with S302.

Note that at S404, the DeNB 500 may include the information on the surrounding environments determined as non-operational in ENB CONFIGURATION UPDATE FAILURE to be transmitted to the RN 600.

Figures 15, 16:
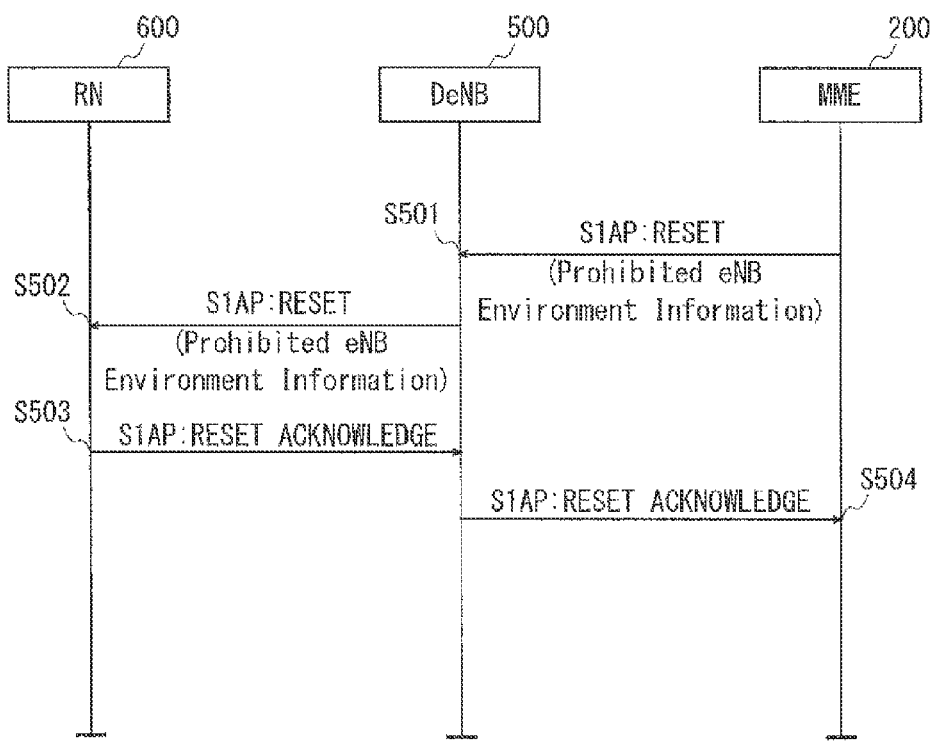
FIG. 15 shows an example of information transmitted from a DeNB to an RN in the fourth exemplary embodiment.
FIG. 16 is a sequence diagram showing an operation according to a fifth exemplary embodiment.

FIG. 15 is a diagram showing an example of IEs in the ENB CONFIGURATION UPDATE FAILURE in such a case. IEs of Prohibited eNB Environment Information are information on the surrounding environments determined as non-operational, but are not disclosed in Non-Patent Literature 2. The detail of them is the same as that in the third exemplary embodiment. Therefore, its explanation is omitted.

As described above, the DeNB 500 according to the fourth exemplary embodiment receives from the RN 600 the message including the identification information of the RN 600 and the information on the environments around the RN 600, in the case where the S1 connection has been already established. As a result, the DeNB 500 can determine whether or not the RN 600 is operational based on this message. Further, the DeNB 500 notifies the RN 600 of the information on the surrounding environments determined as non-operational when the DeNB 500 determines that the RN 600 is not operational. As a result, it is possible to prompt the RN 600 to operate under appropriate environments. Furthermore, the IEs are added to the existing message using the S1AP. Therefore, it is possible to solve the problems without newly adding any messages.

Fifth Exemplary Embodiment

In a fifth exemplary embodiment, the notification of the information on the surrounding environments determined as non-operational from the DeNB 500 to the RN 600 in the third and fourth exemplary embodiments is applied to a RESET message.

A configuration according to the fifth exemplary embodiment is the same as that according to the third exemplary embodiment. Therefore, its explanation is omitted.

FIG. 16 is a sequence diagram showing an example of an operation according to the fifth exemplary embodiment. Hereinafter, with reference to FIG. 16, there will be described operations of the RN 600, the DeNB 500 and the MME 200.

At S501, the MME 200 transmits a RESET message to the DeNB 500. The detail of RESET is disclosed in Non-Patent Literature 2.

FIG. 17 is a diagram showing an example of IEs of the RESET. IEs of Prohibited eNB Environment Information are information on the surrounding environments determined as non-operational, but are not disclosed in Non-Patent Literature 2. The detail of them is the same as that shown in FIG. 13. Therefore, its explanation is omitted.

At S502 in FIG. 16, the DeNB 500 transmits RESET to the RN 600. The RESET includes the Prohibited eNB Environment Information. Therefore, the RN 600 can acquire the information on the surrounding environments determined as non-operational.

At S503, the RN 600 transmits a RESET ACKNOWLEDGE message to the DeNB 500. The detail of RESET ACKNOWLEDGE is disclosed in Non-Patent Literature 2.

At S504, the DeNB 500 transmits RESET ACKNOWLEDGE to the MME 200.

Note that the DeNB 500 may manage the IEs of Prohibited eNB Environment Information. In this case, the DeNB 500 can include these IEs upon transmitting the RESET to the RN 600, without including these IEs in the RESET from the MME 200 to the DeNB 500

As described above, the DeNB 500 according to the fifth exemplary embodiment notifies the RN 600 of the information on the surrounding environments determined as non-operational by use of the RESET. As a result, it is possible to prompt the RN 600 to operate under appropriate environments. Further, the IEs are added to the existing message using the S1AP. Therefore, it is possible to solve the problems without newly adding any messages.

Note that the method performed in the HeNB-GW 100, the MME 200, the HeNB 300, the UE 400, the DeNB 500 and the RN 600 according to the first to fifth exemplary embodiments may be applied to a program to be executed by a computer. Further, the program can be stored in a storage medium, and can also be externally provided through a network.

While exemplary embodiments have been described in detail, it should be understood that these embodiments are not limiting but may be changed in various ways without departing from the spirit of the present inventive concept.

For example, in a radio communication system defined by 3GPP, the HeNB-GW does not always exist. In such a case, in the first and second exemplary embodiments, the HeNB 300 may transmit and receive message using the S1AP to and from the MME 200, and the MME 200 may perform the operations in the HeNB-GW 100. In other words, the upper node with which the HeNB 300 communicates may be either one of the HeNB-GW 100 and the MME 200. In the case where the upper node is the MME, the HeNB can also be replaced with an eNB in order to apply the exemplary embodiment.

Further, each of the S1 SETUP REQUEST in the first and third exemplary embodiments, the ENB CONFIGURATION UPDATE in the second and fourth exemplary embodiments, the RESET in the fifth exemplary embodiment, and the like is an example of specific messages. Accordingly, the exemplary embodiment may also be applied to other messages using the S1AP.

Furthermore, in the third to fifth exemplary embodiments, while the DeNB 500 includes the information on the surrounding environments determined as non-operational in the message to be notified to the RN 600, the DeNB 500 may notify information on surrounding environments determined as operational.

It should be noted that the present invention is not limited to the above exemplary embodiments but modification can be made as needed without deviating from the spirit and scope the invention as defined by the claims.

What is claimed is:

1. A radio base station, comprising:
a controller that generates a message comprising an identification information of the radio base station and an information on an environment around the radio base station; and
a transmitter that transmits the generated message to a Home Evolved Node B Gateway (HeNB-GW),
wherein the information on the environment around the radio base station includes identification information of a HeNB-GW most recently connected to the radio base station,
wherein the identification information and the information on the environment around the radio base station are used by the HeNB-GW for a determination of whether or not the radio base station is operational,
wherein when it is determined that the radio base station is operational, the identification information of the radio base station and information on an environment around the radio base station is forwarded from the HeNB-GW to the Mobility Management Entity (MME) to carry on a normal processing for the radio base station, and
wherein when it is determined that that base station is non-operational, a failure message is transmitted from the HeNB-GW to the radio base station to disconnect a connection between the radio base station and the HeNB-GW.

2. The radio base station according to claim 1, wherein the message further comprises a request to establish a connection with the communication node.

3. The radio base station according to claim 1, further comprising a detector that detects whether or not the radio base station is installed;
wherein the controller generates the message in response to the detection.

4. The radio base station according to claim 1, wherein the message comprises a S1 SETUP REQUEST message.

5. The radio base station according to claim 1, wherein the message comprises a ENB CONFIGURATION UPDATE message.

6. The radio base station according to claim 1 wherein the information on the environment around the radio base station comprises information indicating parameters based on a detected radio environment.

7. The radio base station according to claim 6, wherein the information indicating parameters based on the detected radio environment comprises at least one of:
information on a cell in E-UTRAN,
information on a cell in UTRAN,
information on a cell in GERAN,
information on information on a WiMAX-compatible base station,
information on a wireless Internet hotspot,
information on a television station,
information on a radio station, and
information on GPS.

8. The radio base station according to claim 1, wherein the information on the environment around the radio base station includes at least one of:
an IP address assigned to the radio base station, and
an address, a post code or a phone number regarding a location at which the radio base station is installed.

9. A Home Evolved Node B Gateway (HeNB-GW), adapted to communicate with a radio base station, the HeNB-GW comprising:
a receiver that receives, from the radio base station, a message including identification information of the radio base station and information on an environment around the radio base station; and
a controller that performs a control of the radio base station based on the identification information and the information on the environment around the radio base station,
wherein the information on the environment around the radio base station includes identification information of a HeNB-GW most recently connected to the radio base station,
wherein the controller performs a determination of whether or not the radio base station is operational, based on the identification information and the information on the environment around the radio base station;
wherein when it is determined that the radio base station is operational, the identification information of the radio base station and information on an environment around the radio base station is forwarded from the HeNB-GW to the Mobility Management Entity (MME) to carry on a normal processing for the radio base station, and
wherein when it is determined that that base station is non-operational, a failure message is transmitted from the HeNB-GW to the radio base station to disconnect a connection between the radio base station and the HeNB-GW.

10. The communication node according to claim 9, further comprising:
a transmitter that transmits, when the radio base station is not operational, an outgoing message to the radio base station,
wherein the outgoing message comprises information indicating parameters based on the environment around the radio base station that is not operational.

11. The communication node according to claim 9, further comprising:
a memory that stores a predetermined information,
wherein the determination is performed by comparing the predetermined information with the information on the environment around the radio base station.

12. A control method for a radio base station, the control method comprising:
generating a message comprising an identification information of the radio base station and an information on an environment around the radio base station; and
transmitting the generated message to a Home Evolved Node B Gateway (HeNB-GW),
wherein the information on the environment around the radio base station includes identification information of a HeNB-GW most recently connected to the radio base station,
wherein the identification information and the information on the environment around the radio base station are used by the communication node for a determination of whether or not the radio base station is operational;
wherein when it is determined that the radio base station is operational, the identification information of the radio base station and information on an environment around the radio base station is forwarded from the HeNB-GW to the Mobility Management Entity (MME) to carry on a normal processing for the radio base station, and wherein when it is determined that that base station is non-operational, a failure message is transmitted from the HeNB-GW to the radio base station to disconnect a connection between the radio base station and the HeNB-GW.

13. A control method for a Home Evolved Node B Gateway (HeNB-GW), adapted to communicate with a radio base station, the control method comprising:

receiving, from radio base station, a message including identification information of the radio base station and information on an environment around the radio base station; and performing a control of the radio base station based on the identification information and the information on the environment around the radio base station, wherein the information on the environment around the radio base station includes identification information of a HeNB-GB most recently connected to the radio base station, wherein the performing of the control performs a determination of whether or not the radio base station is operational, based on the identification information and the information on the environment around the radio base station;

wherein when it is determined that the radio base station is operational, the identification information of the radio base station and information on an environment around the radio base station is forwarded from the HeNB-GW to the Mobility Management Entity (MME) to carry on a normal processing for the radio base station, and wherein when it is determined that that base station is non-operational, a failure message is transmitted from the HeNB-GW to the radio base station to disconnect a connection between the radio base station and the HeNB-GW.

* * * * *